United States Patent [19]

Wariishi et al.

[11] Patent Number: 5,459,265
[45] Date of Patent: Oct. 17, 1995

[54] SILVER HALIDE PHOTOGRAPHIC LIGHT-SENSITIVE MATERIAL

[75] Inventors: Koji Wariishi; Keiichi Suzuki, both of Kanagawa, Japan

[73] Assignee: Fuji Photo Film Co., Ltd., Kanagawa, Japan

[21] Appl. No.: 216,285

[22] Filed: Mar. 23, 1994

[30] Foreign Application Priority Data

Mar. 24, 1993 [JP] Japan ................................. 5-065060
Nov. 1, 1993 [JP] Japan ................................. 5-273811

[51] Int. Cl.$^6$ .................. C07D 413/06; C07D 417/06; G03C 5/26; G03C 7/32
[52] U.S. Cl. .................. 544/300; 544/299; 544/301; 544/302; 544/303; 544/306; 430/541; 430/495; 430/486; 430/570
[58] Field of Search .................. 544/300–303, 544/299, 306

[56] References Cited

U.S. PATENT DOCUMENTS

| | | | |
|---|---|---|---|
| 2,739,964 | 3/1956 | Brooker et al. | 544/300 |
| 2,882,159 | 4/1959 | Brooker et al. | 544/300 |
| 3,247,127 | 3/1961 | Bailey | 252/300 |
| 4,874,866 | 10/1989 | Gunther et al. | 544/300 |
| 4,885,366 | 12/1989 | Gunther et al. | 544/300 |
| 4,906,750 | 3/1990 | Gunther et al. | 544/300 |
| 4,937,344 | 6/1990 | Gunther et al. | 544/300 |
| 5,003,077 | 3/1991 | Hioki et al. | 544/300 |
| 5,208,336 | 5/1993 | Gunther et al. | 544/300 |

FOREIGN PATENT DOCUMENTS

| | | |
|---|---|---|
| 2757982 | 6/1979 | Germany . |
| 3247812 | 6/1983 | Germany . |
| 3223747 | 10/1991 | Japan . |
| 4352151 | 12/1992 | Japan . |

OTHER PUBLICATIONS

Onishi et al. Chem. Abst. 121:145204 (1994).
Aritomi et al. Chem. Abst. 118:263794 (1993).
Kawashima et al. Chem. Abst. 118:136124 (1993).
Ohashi et al. Chem. Abst. 117:121411 (1992).
Ailliet et al. Chem. Abst. 109: 46084 (1988).

*Primary Examiner*—Cecilia Tsang
*Attorney, Agent, or Firm*—Sughrue, Mion, Zinn, Macpeak & Seas

[57] ABSTRACT

There is disclosed a silver halide photographic light-sensitive material having a hydrophilic colloid layer containing a dye which is photochemically inactive and can readily be decolored and/or eluted in a photographic processing course. The silver halide photographic light-sensitive material comprises a hydrophilic colloid layer containing at least one dye dispersed in the form of a solid fine particle represented by Formula (I):

$$X_1 = \underset{\underset{R_2}{\overset{R_1}{N}}}{\overset{O}{\underset{O}{\bigcirc}}} = L_1 + L_2 = L_3 \underset{n}{\overset{HO}{\underset{O}{\bigcirc}}} \underset{\underset{R_4}{\overset{R_3}{N}}}{\overset{}{\bigcirc}} = X_2 \quad (I)$$

wherein $R_1$, $R_2$, $R_3$, $R_4$, $X_1$, $X_2$, $L_1$, $L_2$, $L_3$ are defined in the disclosure.

In a preferred embodiment, the maximum absorption wavelength λmax of the dye in the hydrophilic colloid layer satisfies the following equation:

λmax>[λmax(DMF)+20×(n+1)] nm wherein λmax(DMF) and n are defined in the disclosure. There is also disclosed an oxonol compound which is useful as a dye.

7 Claims, 1 Drawing Sheet

SILVER HALIDE PHOTOGRAPHIC LIGHT-SENSITIVE MATERIAL

FIELD OF THE INVENTION

The present invention relates to a silver halide photographic light-sensitive material having a colored hydrophilic colloid layer, specifically to a silver halide photographic light-sensitive material having a hydrophilic colloid layer containing a dye which is photochemically inactive and can readily be decolored and/or eluted in a photographic processing course.

Further, the present invention relates to a novel oxonol compound which can be used as a pigment, a dye, a dye for a photography, a dye for a filter, a recording compound for an optical information recording medium, and a dyeing agent for an organism sample such as a cell, or pharmaceuticals or the intermediates thereof.

BACKGROUND OF THE INVENTION

In a silver halide photographic light-sensitive material, a photographic emulsion layer and the other hydrophilic colloid layers are often colored for the purpose of absorbing a light of a specific wavelength.

When it is necessary to control a spectral composition of a light to be incident to a photographic emulsion layer, a colored layer is usually provided on a side farther from a support than the photographic emulsion layer. Such the colored layer is called a filter layer. In the case where plural photographic emulsion layers are involved, the filter layer may be interposed therebetween.

For the purpose of preventing a blurring of an image, that is, halation caused by a light which is scattered in or after passing through a photographic emulsion layer and is reflected on an interface between the emulsion layer and support or a surface of a photographic material opposite to the emulsion layer side to get once again in the photographic emulsion layer, a colored layer which is called an anti-halation layer is provided. In the case where plural photographic emulsion layers are involved, the anti-halation layer is sometimes provided at the middle of them.

The photographic emulsion layer is colored as well in order to prevent the deterioration of an image sharpness caused by a light scattered in the photographic emulsion layer (in general, this phenomenon is called an irradiation).

Dyes are usually incorporated into these hydrophilic colloid layers to be colored. These dyes are required to satisfy the following conditions:

(1) having an appropriate spectral absorption according to use purposes;

(2) photochemically inactive, that is, giving no adverse affections in a chemical sense, for example, reduction of a sensitivity, degradation of a latent image and fogging, to the performances of a silver halide photographic emulsion layer;

(3) bleached in photographic processing steps or eluted in a processing solution or water for washing to leave no harmful color on a processed photographic light-sensitive layer;

(4) not diffusing from a colored layer to the other layers; and (5) having an excellent storage stability in a solution or a photographic material without discoloring or fading.

In particular, in the case where a colored layer is a filter layer or an anti-halation layer provided on the same side of a support as a photographic emulsion layer is present, it is necessary in many cases that those layers are selectively colored and that the other layers are not substantially colored, because otherwise not only a harmful spectral effect is exerted to the other layers but also an effect as a filter layer or an anti-halation layer is reduced. Further, also in case of preventing an irradiation, selective coloring only of an aimed emulsion layer is required to prevent a similar adverse affection from being exerted to the other layers and allow a desired performance to sufficiently be revealed. However, the contact of a layer containing a dye to the other hydrophilic layers in a wet condition often permits a part of the dye to diffuse from the former to the latter. Many efforts have so far been made in order to prevent such diffusion of the dye.

For example, U.S. Pat. Nos. 2,548,564, 4,124,386 and 3,625,694 disclose a process in which a hydrophilic polymer having a charge opposite to a dissociated anionic dye is permitted to coexist as a mordant in a layer to localize the dye in a specific layer by means of an interaction with a dye molecule.

Further, U.S. Pat. Nos. 2,719,088, 2,496,841 and 2,496,843, and JP-A-60-45237 (the term "JP-A" as used herein means an unexamined published Japanese patent application) disclose a process in which the metal salt fine particles adsorbed thereon with a dye are used to color a specific layer.

Further, JP-A-55-120030, JP-A-56-12639, JP-A-55-155350, JP-A-55-155351, JP-A-63-27838, JP-A-63-197943, and JP-A-52-92716, European Patents 15,601, 323,729, 274,723, 276,566 and 299,435, WO 88/04794, and JP-A-3-223747 disclose a process in which a specific layer is colored with a water insoluble solid dye.

However, even the use of these improved processes still has presented a problem on a diffusion of a dye in a dye-fixing layer and a problem that a decoloring speed in a development processing is still so slow that in the case where various factors such as the acceleration of a processing, the improvement in a composition of a processing solution and the improvement in a composition of a photographic emulsion are changed, a decoloring function thereof can not necessarily be sufficiently demonstrated.

On the other hand, a representative dye used in such the processes includes an oxonol compound, and there are known the compounds described, for example, in The Chemistry of Synthetic Dyes, Vol. 4, p. 304 (Academic Press, 1991), Color and Constitution of Organic Molecules, p. 257 (Academic Press, 1991), JP-A-50-91627 and JP-A-60-97274, and Absorption Spectra of Dyes for Diode Lasers, p. 86 (Bunsin, 1990).

As described above, coloring of a hydrophilic colloid layer constituting a photographic light-sensitive material is important for controlling a spectral sensitivity and preventing blurring of an image caused by scattering of an incident ray (irradiation) and blurring of an image attributable to a reflection of a ray generated at an interface between a photographic emulsion and a support (halation). For this purpose, a barbituric acid oxonol compound having an absorption in a visible region is widely used as disclosed, for example, in U.S. Pat. No. 3,247,127, and JP-A-3-223747 and JP-A-4-352151.

Also in a near infrared-sensitive photographic material, the oxonol compound is added for the same purpose. However, a conventional pentamethineoxonol dye does not have an appropriate long wavelength absorption and is instable in a hydrophilic colloid layer. Accordingly, it is not appropriate. Further, a heptamethineoxonol dye provides particularly an industrial problem on achievement of the above purpose in terms of, for instance, difficulty to obtain a methine source.

SUMMARY OF THE INVENTION

Accordingly, the first object of the present invention is to provide a photographic light-sensitive material containing a dye dispersed in the form of a solid fine particle, which is designed so that a specific hydrophilic colloid layer in the photographic light-sensitive material is colored and that the dye is prevented from being diffused to the other layers during storage and it is quickly decolored during a development processing.

Further, the second object of the present invention is to provide a pentamethineoxonol dye which has an absorption in a near infrared region and is stable in a hydrophilic colloid layer and which can be readily and inexpensively synthesized.

The first object of the present invention can be achieved by a silver halide photographic light-sensitive material comprising a hydrophilic colloid layer containing at least one dye dispersed in the form of a solid fine particle represented by the following Formula (I):

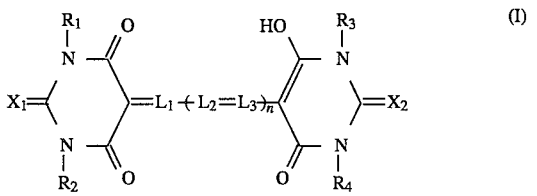

wherein $R_1$, $R_2$, $R_3$ and $R_4$ each represent a hydrogen atom, an aliphatic group, an aromatic group, or a heterocyclic group; $X_1$ and $X_2$ each represent an oxygen atom or a sulfur atom; $L_1$, $L_2$ and $L_3$ each represent a methine group; n represents 0, 1 or 2; provided that $R_1$, $R_2$, $R_3$, $R_4$, $L_1$, $L_2$, and $L_3$ do not have a group having proton capable of being converted to an ion, or a salt thereof; and in case of n=2, at least one of $L_1$, $L_2$ and $L_3$ contains a substituent.

In a preferred embodiment, the maximum absorption wavelength λmax of the dye represented by formula (I) in the hydrophilic colloid layer satisfies the following equation:

λmax>[λmax(DMF)+20×(n+1)] nm wherein λmax(DMF) represents a maximum absorption wavelength of the dye in dimethylformamide; and n is synonymous with n defined in Formula (I).

The second object can be achieved by an oxonol compound represented by the following Formula (V):

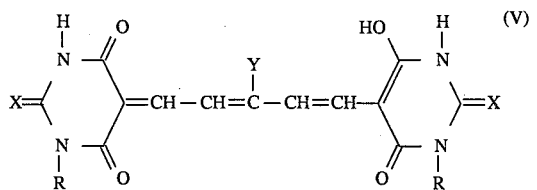

wherein R represents an aryl group; X represents a chalcogen atom; Y represents an alkyl group; provided that R and Y each do not have a group having proton capable of being ionized or a salt thereof.

The axis of abscissa shows a wavelength region and the axis of ordinates shows a sensor relative brightness.

Figure 2:
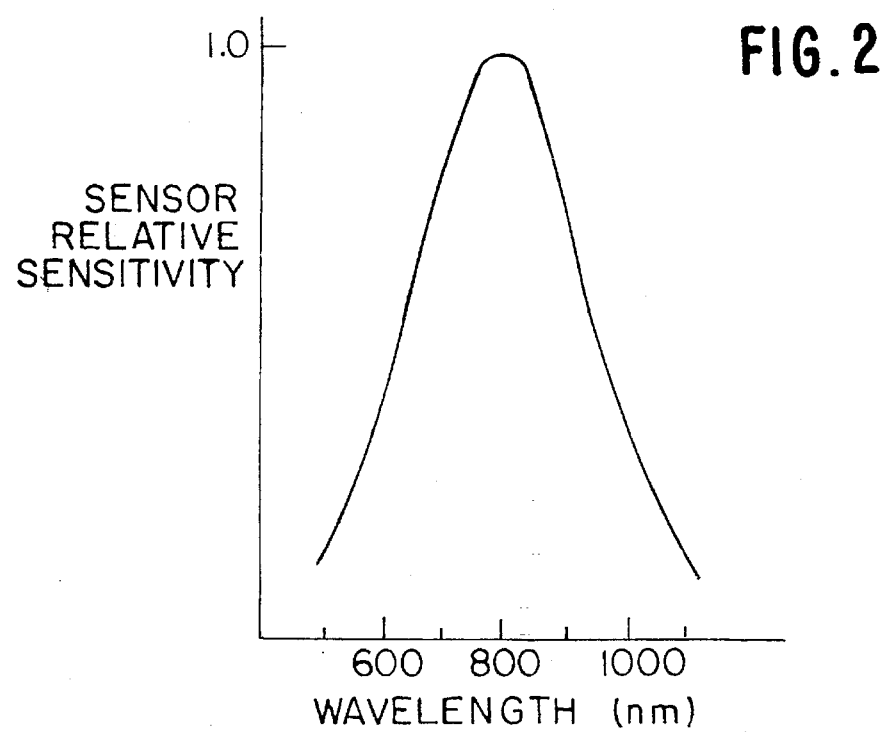

FIG. 2 shows a spectral sensitivity characteristic of an infrared ray receiving element at a film inserting port of the automatic developing machine used in Example 3.

DETAILED DESCRIPTION OF THE INVENTION

Next, the dye of Formula (I) will be explained in detail.

The aliphatic group represented by $R_1$, $R_2$, $R_3$ and $R_4$ preferably includes a linear, branched or cyclic alkyl group having 1 to 10 carbon atoms, an aralkyl group having 7 to 10 carbon atoms, and an alkenyl group having 2 to 10 carbon atoms (e.g., ethyl, propyl, n-butyl, sec-butyl, t-butyl, iso-butyl, n-pentyl, n-hexyl, n-heptyl, n-octyl, cyclohexyl, 2-ethylhexyl, 3-methylbutyl, cyclopentyl, 2-ethylbutyl, vinyl, allyl, 1-propenyl), which may have a substituent(s) including a nitro group, an amino group having 0 to 6 carbon atoms (e.g., an unsubstituted amino group, dimethylamino, diethylamino), an aryl group having 6 to 10 carbon atoms (e.g., phenyl, 2-chlorophenyl), an alkylthio group having 1 to 8 carbon atoms (e.g., methylthio, ethylthio), a carbonamide group having 2 to 8 carbon atoms (e.g., acetylamino, propionylamino), an oxycarbonylamino group having 2 to 8 carbon atoms (e.g., methoxycarbonylamino, n-butoxycarbonylamino), a carbamoyl group having 2 to 8 carbon atoms (e.g., dimethylcarbamoyl, diethylcarbamoyl), and an acyl group having 2 to 8 carbon atoms (e.g., acetyl, propionyl).

The aromatic group represented by $R_1$, $R_2$, $R_3$ and $R_4$ preferably includes an aromatic group having 6 to 10 carbon atoms, for example, phenyl and naphthyl, and it is more preferably phenyl, which may have a substituent(s), in addition to the substituents enumerated as the substituents for the alkyl group represented by $R_1$, $R_2$, $R_3$ and $R_4$, an alkyl group having 1 to 4 carbon atoms (e.g., methyl, ethyl, t-butyl, n-propyl), a halogen atom (e.g., F, Cl, Br), a cyano group, an alkoxy group having 1 to 8 carbon atoms (e.g., methoxy, ethoxy, propoxy, and phenoxy), an ester group having 2 to 8 carbon atoms (e.g., methyoxycarbonyl, ethoxycarbonyl), and an alkylsulfonyl group having 1 to 8 carbon atoms (e.g., methanesulfonyl, ethanesufonyl).

The heterocyclic group represented by $R_1$, $R_2$, $R_3$ and $R_4$ preferably includes a 5- or 6-membered heterocyclic ring containing oxygen, nitrogen or sulfur as a hetero atom, and there can be enumerated a pyridyl group, an imidazolyl group, a furyl group, a thienyl group, a pyrrole group, an indolyl group, a morpholino group, and a pyrrolidyl group. These heterocyclic groups may have the substituent(s) the above aromatic groups represented by $R_1$, $R_2$, $R_3$ and $R_4$ may have.

In a preferred embodiment, $R_1$ and $R_3$ each represent a hydrogen atom and $R_2$ and $R_4$ each represent an alkyl group or a phenyl group.

$X_1$ and $X_2$ each represent preferably an oxygen atom.

In case of n=0 or 1, the methine groups represented by $L_1$, $L_2$ and $L_3$ may be unsubstituted or substituted (e.g., methyl, ethyl, benzyl, phenyl, chloro, amino, piperidino, morpholino).

In case of n=2, at least one of the methine groups represented by $L_1$, $L_2$ and $L_3$ contains a substituent (e.g., methyl, ethyl, benzyl, phenyl, chloro, amino, piperidino, morpholino, hydroxy), and the methine groups themselves may be combined to form a 5- or 6-membered ring (for example, a cyclopentene ring, a cyclohexene ring, a 1-chlorocyclohexene ring, a 1-dimethylaminocyclopentene ring, and a 1-morpholinocyclopentene ring).

The substituent for the methine groups represented by $L_1$, $L_2$ and $L_3$ is preferably an unsubstituted alkyl group having 1 to 4 carbon atoms.

n is preferably 2.

In the dye of Formula (I), the group having proton capable of being converted to an ion includes, for example, a carboxyl group, a sulfonamido group, a sulfamoyl group, and a group having proton of pKa=4 to 11 (water/ethanol= 1/1). The examples of the dye represented by Formula (I) will be shown below but the present invention should not be limited thereto.

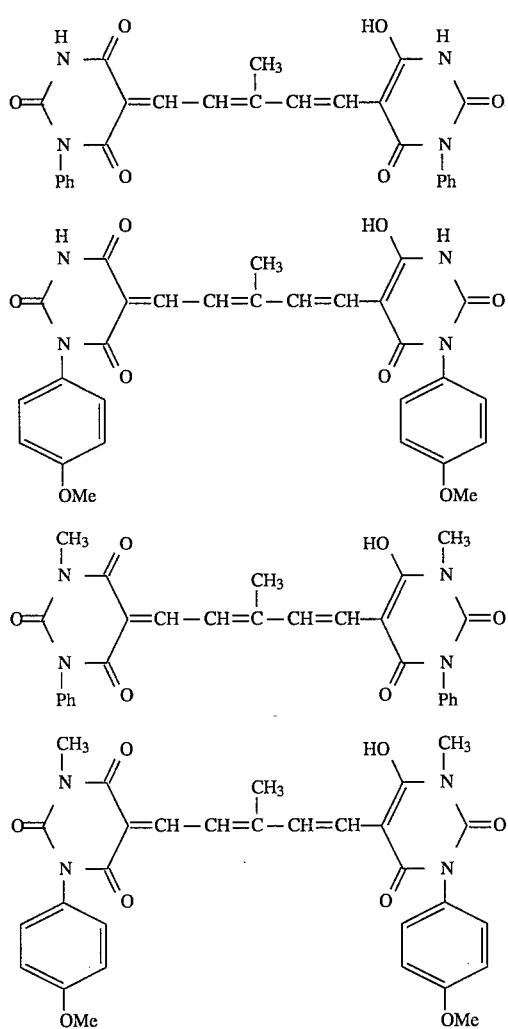

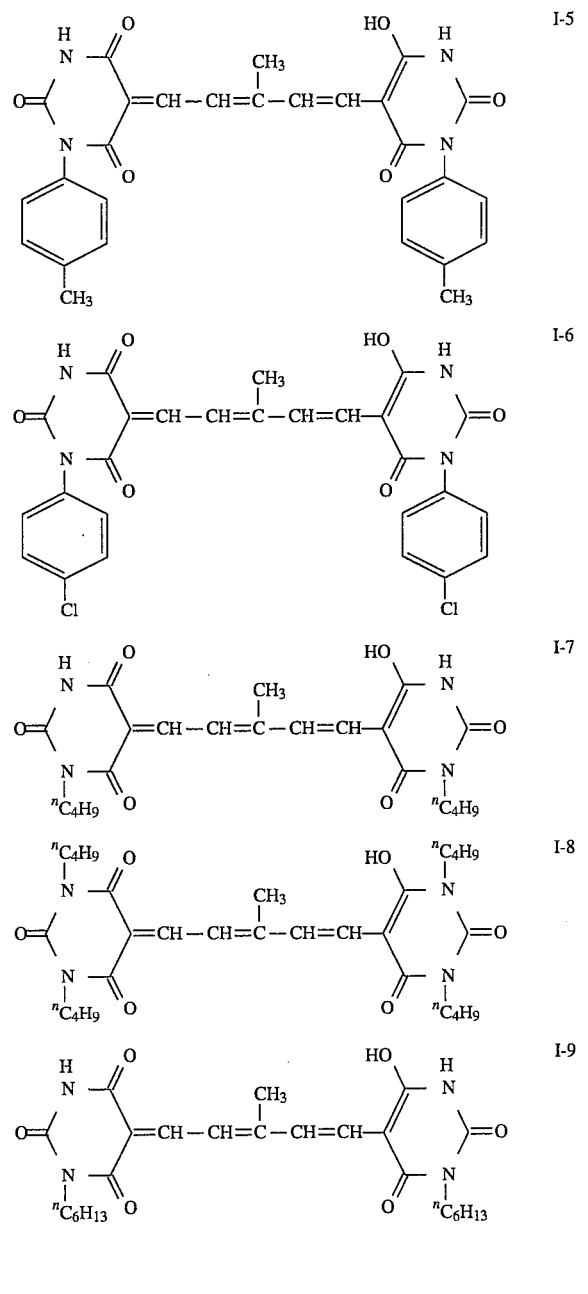

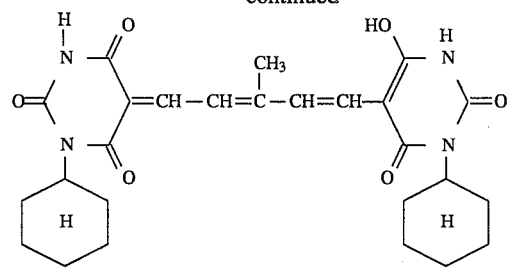 I-10
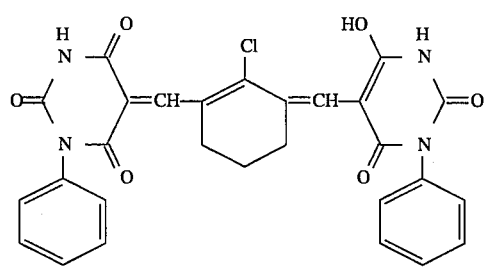 I-11
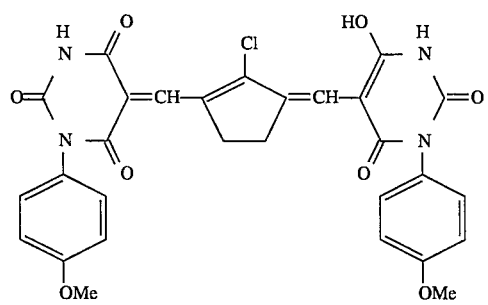 I-12
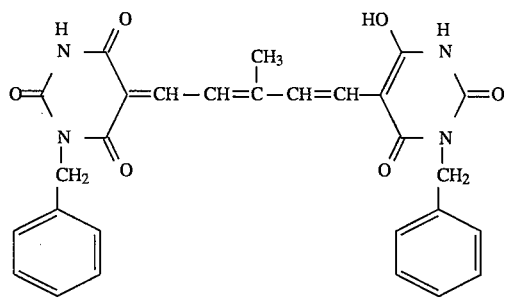 I-13
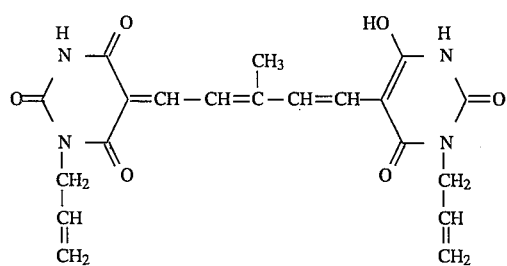 I-14
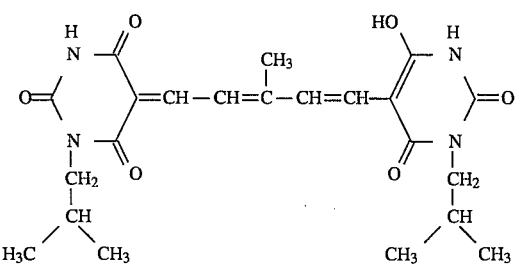 I-15
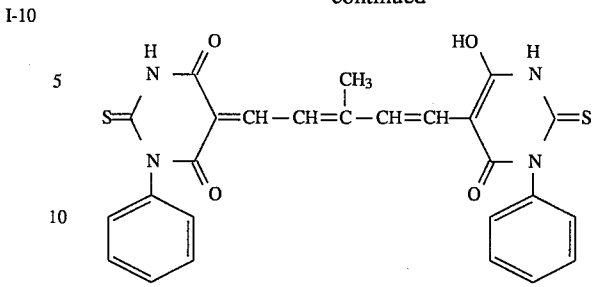 I-16
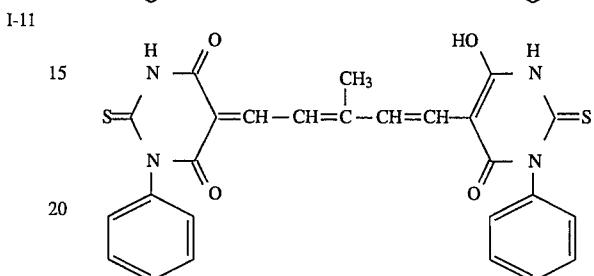 I-17
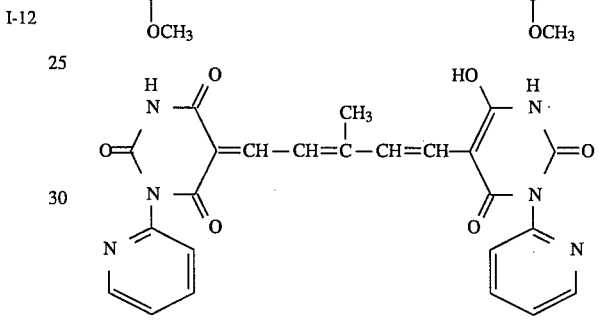 I-18
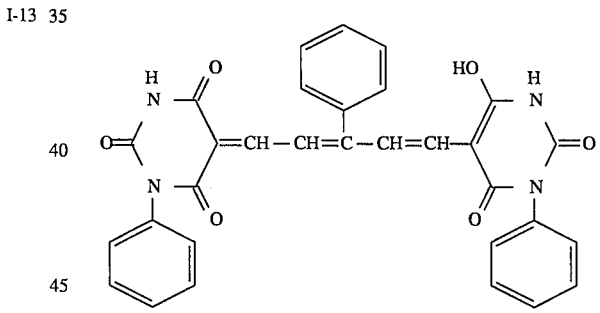 I-19
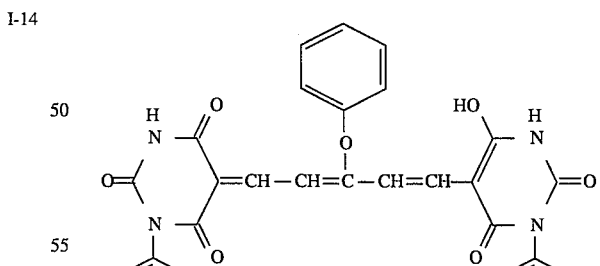 I-20

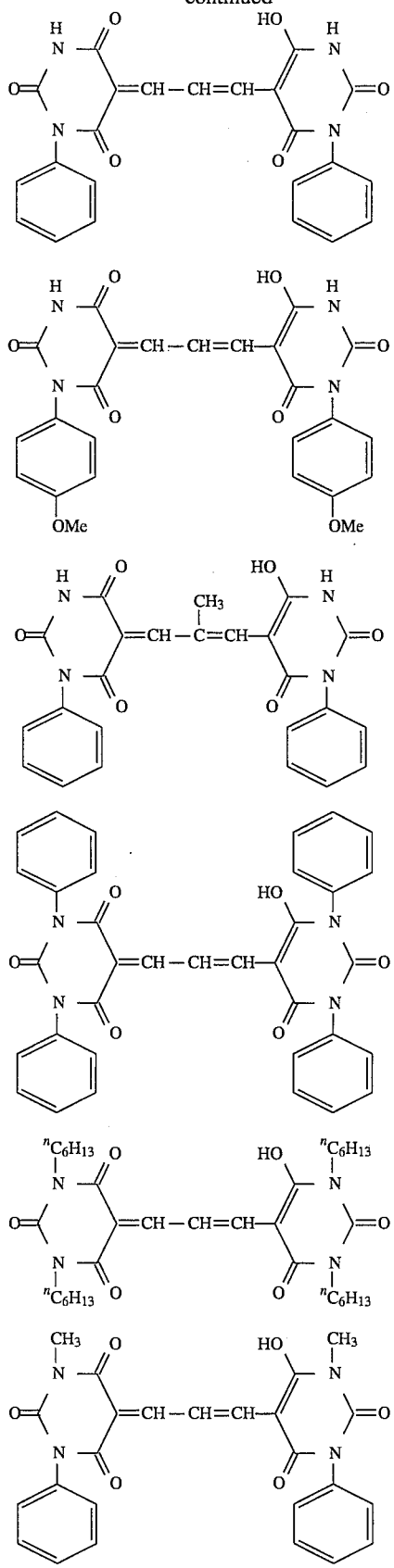
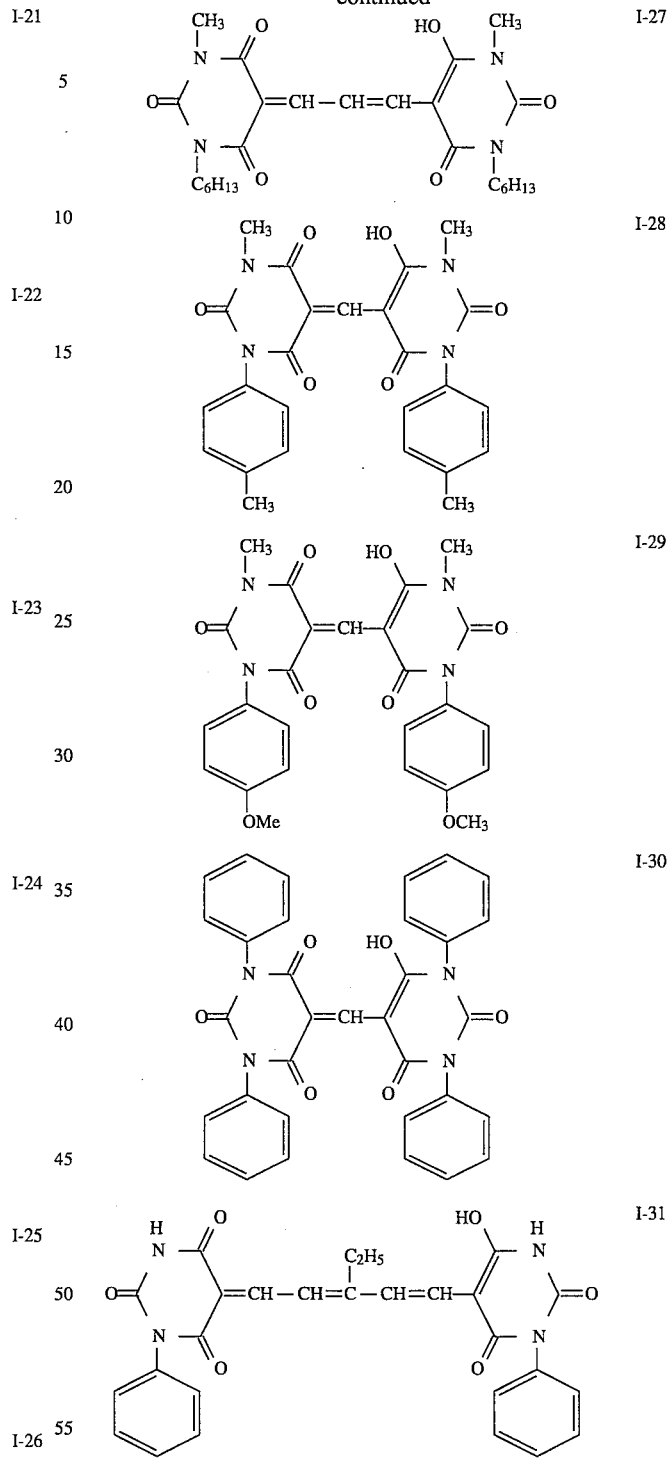

The compound which is the dye represented by Formula (I) and an absorption wavelength of which in a hydrophilic clloid layer falls within the range shown by Formula (II) described above has a markedly excellent characteristic in terms of that it colors a specific layer in a photographic light-sensitive material and is not diffused to the other layers during storage and further that it is rapidly decolored during a development processing.

Next, the compound of Formula (V) will be explained in detail.

The aryl group represented by R is preferably an aryl group having 6 to 10 carbon atoms (e.g., phenyl, naphthyl), more preferably phenyl. It may have a substituent(s) (for example, a halogen atom (e.g., F, Cl, Br), a cyano group, a nitro group, an alkyl group having 1 to 4 carbon atoms (e.g., methyl, ethyl, propyl, iso-propyl, sec-butyl, n-butyl, t-butyl), an amino group having 0 to 6 carbon atoms (e.g., an unsubstituted amino group, dimethylamino, diethylamino), an alkoxy group having 1 to 8 carbon atoms (e.g., methoxy, ethoxy, butoxy, phenoxy, p-methylphenoxy), an aryl group having 6 to 10 carbon atoms (e.g., phenyl, 2-chlorophenyl), an ester group having 2 to 8 carbon atoms (e.g., methoxycarbonyl, ethoxycarbonyl), a carbamoyl group having 2 to 8 carbon atoms (e.g., methylcarbamoyl, ethylcarbamoyl), and an acylamino group having 2 to 8 carbon atoms (e.g., acetylamino, propionylamino)).

The number of the substituent is preferably 0 to 3, more preferably 0 or 1.

An alkyl group and a halogen atom are particularly preferred as the substituent.

The chalcogen atom represented by X is preferably an oxygen atom or a sulfur atom, further preferably the oxygen atom.

The alkyl group represented by Y is preferably an alkyl group having 1 to 8 carbon atoms (e.g., methyl, ethyl), more preferably an unsubstituted alkyl group having 1 to 4 carbon atoms.

The compound represented by Formula (V) is dissolved or dispersed in a suitable solvent (for example, water and methyl alcohol) for use. It is used preferably in a dispersion. The solution or dispersion is used more preferably mixing with a hydrophilic colloid. Any of those which have so far been known can be used as the hydrophilic colloid. Gelatin is representative and preferred.

The compound represented by Formula (V) is particularly useful as a photographic dye (dyes for anti-irradiation and anti-halation, and filter dyes). The compound represented by Formula (V) can be applied to a photographic material by using the processes described, e.g., in JP-A-4-37740 and JP-A-4-127143.

I-1, I-2, I-5, I-6, I-16, and I-31 described above can be enumerated as the specific non-limiting examples of the compound represented by Formula (V).

The oxonol dye represented by Formula (I) and (V) in the present invention can be synthesized by the processes known by the person ordinarily skilled in the art (for example, a condensation reaction of the corresponding suitably substituted barbituric acids compounds and the methine resources for introducing a methine group or a poly methine chain into a methine dye). The details of this kind of the compounds can be referred, e.g., to British Patent 1,133,986, and U.S. Pat. Nos. 3,247,127 and 4,042,397.

To be specific, there can be used ethyl orthoformate, ethyl orthoacetate or N-diphenylformamidine hydrochlorate for the introduction of a monomethine group, trimethoxypropene, tetramethoxypropene or malonaldehydedianil hydrochlorate for the introduction of a trimetnine chain, and 3-methylglutaconaldehydedianil hydrochlorate or 1-(2,4-dinitrophenyl)- 4-methylpyridinium chloride for the introduction of a pentamethine chain.

Synthetic example 1 (synthesis of Dye I-1)

A mixed suspended solution of N-phenylbarbituric acid (5.0 g), 3-methylglutaconaldehydedianil hydrochlorate (3.5 g), and dimethylformamide (25 ml) was cooled with water, and then triethylamine (5.0 ml) was dropped thereto. After stirring for 1 hour at the same temperature, stirring was applied for further one hour at a room temperature. A mixed solution of a 2N hydrochloric acid aqueous solution (25 ml) and methanol (25 ml) was slowly added to this reaction solution. Deposited crystal was filtered and washed with MeOH, followed by drying, whereby Dye I-1 (17.0 g) was obtained.

$\lambda max(DMF)=618$ nm, $\epsilon max=1.57 \times 10^5$

Synthetic example 2 (synthesis of Dye I-3):

Dye I-3 (7.1 g) was obtained in the same manner as that in the synthetic example 1, except that N-phenylbarbituric acid was replaced with 1-methyl-3-phenylbarbuturic acid (5.2 g).

$\lambda max(DMF)=620$ nm, $\epsilon max=1.73 \times 10^5$

Synthetic example 3 (synthesis of Dye I-22):

Triethylamine (4.4 ml) was dropped to a mixed suspended solution of 1-p-methoxyphenylbarbituric acid (5.0 g), malonaldehydedianil hydrochlorate (2.7 g), and dimethylformamide (25 ml) at a room temperature to dissolve them. After stirring for 2 hours at the same temperature, a mixed solution of a 2N hydrochloric acid aqueous solution (25 ml) and methanol (25 ml) was slowly added to this reaction solution to filtrate deposited crystals. They were washed with MeOH and then dried, whereby Dye I-22 (6.0 g) was obtained.

$\lambda max(DMF)=492$ nm, $\epsilon max=1.12 \times 10^5$

Synthetic example 4 (synthesis of Dye I-25):

Dye I-25 (6.8 g) was obtained in the same manner as that in the synthetic example 3, except that 1-p-methoxyphenylbarbituric acid was replaced with 1,3-dihexylbarbuturic acid (6.3 g).

$\lambda max(DMF)=502$ nm, $\epsilon max=8.62 \times 10^4$

Synthetic example 5 (synthesis of Dye I-28):

A mixture of 1-methyl-3-p-tolylbarbituric acid (5.0 g), ethyl orthoformate (2.1 g), and acetic acid (25 ml) was heated and stirred on a steam bath for 3 hours (an inner temperature: 80° to 85° C.). After a reaction solution was cooled down to a room temperature, it was added to cold methanol (100 ml) and deposited crystals were filtrated, followed by washing with methanol and drying the crystals, whereby Dye I-28 (3.8 g) was obtained.

$\lambda max(DMF)=386$ nm, $\epsilon max=3.50 \times 10^4$

Barbituric acids represented by Formula (IV), which are the raw materials for the dyes used in the present invention, can be synthesized by reacting a urea derivative represented by Formula (III) with malonic acid under the presence of acetic anhydride or with malonic ester under a base condition. The details of the synthetic processes of these compounds can be referred, e.g., to "New Experimental Chemistry Course" (Vol. 14) (Maruzen) and J. Am. Chem. Soc. 78, pp. 6185 (1956).

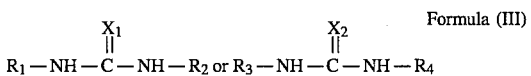

Formula (III)

$$R_1-NH-\overset{X_1}{\underset{\|}{C}}-NH-R_2 \text{ or } R_3-NH-\overset{X_2}{\underset{\|}{C}}-NH-R_4$$

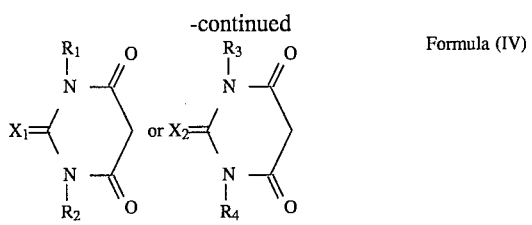

Formula (IV)

In the present invention, there can arbitrarily be selected for dispersing the dye represented by Formula (I) or (V), a disperser and a vibrating ball mill such as a ball mill, a sand mill, and a colloid mill, and a disperser such as a planetary ball mill, a jet mill, a roll mill, Manton-Gaulin, a microfulidizer, and a disk impeller mill, as described in JP-A-52-92716 and WO 88/04794. A medium disperser of a vertical type or a horizontal type is preferred.

In any cases, a solvent (for example, water) is preferably used, and further a surface active agent for dispersion is more preferably used. There can be used as the surface active agent for dispersing, an anionic surface active agent as described in JP-A-52-92716 and WO 88/04794, and an anionic polymer as described in JP-A-4-324858. A nonionic surface active agent or a cationic surface active agent can be used as well depending on the purpose, but the anionic polymer or the anionic surface active agent is preferred.

Further, after the dye of the present invention is dissolved in a suitable solvent, a poor solvent for the dye of the present invention is added to allow fine crystals to be deposited. Also in this case, the above surface active agents for dispersing may be used as well. Alternatively, pH is controlled in a solvent to allow the dye to be first dissolved and then pH is changed to permit it to be finely crystallized.

The dye of the present invention in a dispersion has an average particle size of 0.005 to 10 μm, preferably 0.01 to 1 μm, and more preferably 0.01 to 0.5 μm. In some cases, it is preferably 0.01 to 0.1 μm. The fine particles of the dye are preferably monodispersed.

In dispersing the dye of the present invention, the solid dye may be dispersed as it is without subjecting it to any pre-treatment. In this case, the solid dye kept in a wet condition, which is obtained in a synthetic process of the dye, is preferably used for dispersing.

Further, a heat treatment may be carried out before and/or after dispersing if necessary, and the heat treatment is provided preferably at least after dispersing in order to effectively carry out the heat treatment.

A heating process is not specifically limited as long as a dye solid is heated. A temperature is preferably 40° C. or higher and the upper limit thereof may be any degree as long as it falls within a range in which the dye is not decomposed. It is preferably 250° C. or lower, more preferably 50° to 150° C.

A heating time is not specifically limited as long as it falls within a range in which the dye is not decomposed, and it is 15 minutes to 1 week, more preferably 1 hour to 4 days.

The heating treatment is carried out preferably in a solvent in order to effectively perform it. The kind of the solvent is not limited as long as it does not substantially dissolve the dye of the present invention, and there can be enumerated, for example, water, alcohols (for example, methanol, ethanol, isopropyl alcohol, butanol, isoamyl alcohol, octanol, ethylene glycol, diethylene glycol, and ethyl cellosolve), ketones (for example, acetone and methyl ethyl ketone), esters (for example, ethyl acetate and butyl acetate), alkylcarboxylic acids (for example, acetic acid and propionic acid), nitriles (for example, acetonitrile), and ethers (for example, dimethoxyethane, dioxane, and tetrahydrofuran).

The coexistence of organic carboxylic acids in the heating treatment can more effectively solve the subjects of the present invention. There can be enumerated as organic carboxylic acid, alkylcarboxylic acids (for example, acetic acid and propionic acid), carboxymethyl celluloses (CMC), and arylcarboxylic acids (for example, benzoic acid and salicylic acid).

The amount of organic carboxylic acids can be used by 0.5 to 100 times the weight of the dye of the present invention in the case where they are used as a solvent. In the case where a solvent other than organic carboxylic acids is used under the presence of organic carboxylic acid, it can be used in a weight ratio of 0.05 to 100% based on the dye of the present invention.

The dye of the present invention can be used in an effective arbitrary amount, and it is preferably used so that the optical density thereof falls within the range of 0.05 to 3.0. The addition amount thereof is preferably 0.5 to 1000 mg/m$^2$, more preferably 1 to 500 mg/m$^2$. The addition timing may be in any process before coating.

The dye of the present invention can be used for any of an emulsion layer and the other hydrophilic colloid layers (for example, an intermediate layer, a protective layer, an antihalation layer, and a filter layer). It may be used either for a single layer or plural layers.

Gelatin is representative as a hydrophilic colloid, and in addition thereto, any conventionally known hydrophilic colloids for photographic use can be used.

Preferred as the silver halide emulsion used in the present invention are silver bromide, silver iodide, silver iodobromide, silver iodochlorobromide, silver chlorobromide, and silver chloride.

The silver halide grain used in the present invention is of a regular crystal form such as cube and octahedron, an irregular form such as sphere and a plate, or a composite form of these crystal forms. Further, the mixture of the grains having various crystal forms can be used but the grains having a regular crystal form are preferably used.

With respect to a silver halide grain, a photographic emulsion, a preparation process thereof, a binder or a protective colloid, a hardener, a sensitizing dye, a stabilizer, and an anti-foggant, the contents described at the 18th line of a left lower column at 18 page to the 17th line of a left lower column at page 20 of JP-A-3-238447 can be applied to the present invention as they are.

The light-sensitive material according to the present invention may contain one or more kinds of a surface active agent for various purposes such as a coating aid, an anti-electrification, an improvement in a sliding property, an emulsion dispersion, an anti-adhering, and an improvement in the photographic characteristics (for example, a development acceleration, a hardening of a gradation, and a sensitization).

The light-sensitive material prepared according to the present invention may contain a dye other than the dye of the present invention in a hydrophilic colloid layer as a filter dye or for the various purposes of an anti-irradiation, an anti-halation and others. There are preferably used as such the dye, an oxonol dye, a hemioxonol dye, a styryl dye, a merocyanine dye, an anthraquinone dye, and an azo dye, and in addition thereto, useful as well are a cyanine dye, an azomethine dye, a triarylmethane dye, and a phthalocyanine dye. In the case where these dyes are water soluble, they can be added dissolving in water, and in the case where they are difficult to dissolve in water, they can be added as a solid fine particle dispersion. It is possible as well to add an oil soluble dye to a hydrophilic colloid layer emulsifying by an oil-in-water dispersion process.

With respect to a multi-layer multi-color photographic material, a support, a process for coating a photographic emulsion layer, an exposing means for a light-sensitive material, and a photographic processing of a light-sensitive material, there can be applied the contents described at the 14th line of a right lower column at page 20 to the 2nd line of a right upper column at page 27 of JP-A-3-238447.

This invention will now be illustrated in more detail by reference to the following examples. However, the invention should not be construed as being limited to these examples.

EXAMPLE 1

Preparation of Tabular Grains

A silver nitrate aqueous solution (37 ml) (silver nitrate: 4.00 g) and an aqueous solution (38 ml) containing potassium bromide (5.9 g) were added to a vessel to which potassium bromide (6 g) and gelatin (7 g) were added in 1 liter of water and which is kept at 55° C. by a double jet process for 37 seconds while stirring. Next, gelatin (18.6 g) was added and then a silver nitrate aqueous solution (89 ml) (silver nitrate: 9.8 g) was added over a period of 22 minutes after the temperature was raised to 70° C. A 25% aqueous ammonia solution (7 ml) was added to provide a physical ripening for 10 minutes while keeping the temperature as it was, followed by adding a 100% acetic acid solution (6.5 ml). Subsequently, an aqueous solution of silver nitrate (153 g) and an aqueous solution of potassium bromide were added by a controlled double jet process over a period of 35 minutes while maintaining pAg at 8.5. Then, a 2N potassium thiocyanate aqueous solution (15 ml) was added. After providing a physical ripening for 5 minutes while keeping the temperature as it was, the temperature was lowered down to 35° C. Thus, there were obtained monodispersed pure silver bromide tabular grains having an average projected area-corresponding circle diameter of 1.10 μm, an average thickness of 0.165 μm, and a diameter fluctuation coefficient of 18.5%.

Thereafter, the soluble salts were removed by a sedimentation process. The temperature was raised once again to 40° C. and there were added gelatin (30 g), phenoxy ethanol (2.35 g), and poly(sodium styrenesulfonate) (0.8 g) as a thickener, followed by adjusting pH and pAg to 5.90 and 8.25, respectively, with caustic soda and a silver nitrate solution.

This emulsion was subjected to a chemical sensitization while stirring and keeping the temperature at 56° C.

First, thiourea dioxide (0.043 mg) was added and the emulsion was left for standing as it was for 22 minutes to subject it to a reduction sensitization. Then, 4-hydroxy-6-methyl-1,3,3a,7-tetrazaindene (20 mg) and a sensitizing dye (400 mg) of the following chemical structure were added:

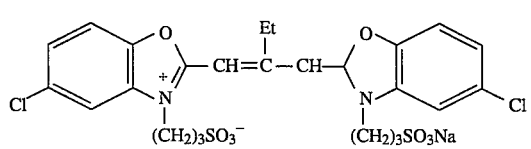

Further, potassium chloride (0.83 g) was added. Subsequently, there were added sodium thiosulfate (1.3 mg), selenium compound-1 (2.7 mg) of the following chemical structure, chlorauric acid (2.6 mg), and potassium thiocyanate (90 mg), and the solution was cooled down to 35° C. 40 minutes later.

Thus, the silver halide tabular grains T-1 was prepared.

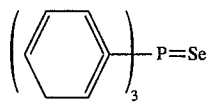

Selenium compound-1

Preparation of Coated Sample

The following compounds per mole of silver halide of T-1 were added to prepare the coating solutions for preparing the coated samples.

| | |
|---|---|
| Gelatin (including gelatin contained in an emulsion) | 65.6 g |
| Trimethylolpropane | 9 g |
| Dextran (average molecular weight: 39,000) | 18.5 g |
| Poly(sodium styrenesulfonate) (an average molecular weight: 600,000) | 1.8 g |
| Hardener/1,2-bis(vinylsulfonylacetamide)ethane and addition amount was adjusted so that a swelling ratio became 230%. | |
| 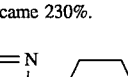 | 34 mg |
|  | 4.8 g |

A surface protective layer was coated so that the coated amounts of the respective components became as shown below:

Composition of the surface protective layer:

| | Coate amount |
|---|---|
| Gelatin | 0.966 g/m² |
| Poly(sodium acrylate) (average molecular weight: 400,000) | 0.023 g/m² |
| 4-Hydroxy-6-methyl-1,3,3a,7-tetrazaindene | 0.015 g/m² |

| | Coate amount |
|---|---|
| 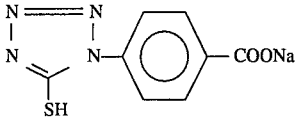 | 1.7 g/m² |
| Polymethyl methacrylate (an average grain size: 3.7 μm) | 0.087 g/m² |
| Proxel (pH was adjusted to 7.4 with NaOH) | 0.0005 g/m² |

Preparation of Support:
(1) Preparation of dye dispersion D-1 for a subbing layer.

The dye I-21 of the present invention was treateded with a ball mill by the process described below.

Water (434 ml) and a 6.7% aqueous solution (791 ml) of a surface active agent Triton X-200 (TX-200) were put in a 2 liter ball mill and the dye I-21 (20 g) was added to this solution. The beads (400 ml) (diameter: 2 mm) of zirconium oxide (ZrO) were put therein and the content was crashed for 4 days. Then, a 12.5% gelatin aqueous solution (160 g) was added and after defoaming, the ZrO beads were removed by filtering. The observation of the dye dispersion thus obtained showed that the particle sizes of the crashed dye were distributed in a wide range extending from 0.05 to 1.20 μm in diameter and that an average particle size was 0.39 μm.

Further, a centrifugal procedure was applied to remove the dye particles having the sizes of 0.9 μm or more. Thus, the dye dispersion D-1 was obtained.
(2) Preparation of Support.

The surface of a biaxially stretched polyethylene terephthalate film with a thickness of 183 μm was subjected to a corona discharge treatment, and the first subbing layer coating solution having the following composition was coated thereon with a wire bar coater so that the coated amount thereof became 5.1 ml/m², followed by drying at 175° C. for one minute.

Next, the first subbing layer was provided as well on the opposite side of the support in the same manner. Polyethylene terephthalate containing 0.04 wt % of the dye having the following chemical structure was used:

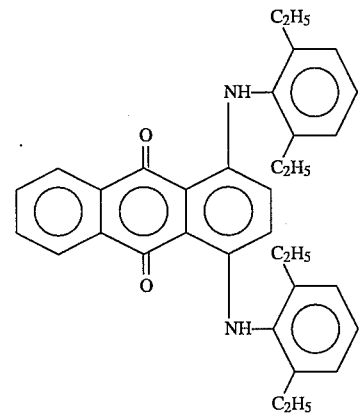

| Butadiene-styrene copolymer latex solution (a solid content: 40%, butadiene/styrene weight ratio: 31/69) | 79 ml |
|---|---|

Note:

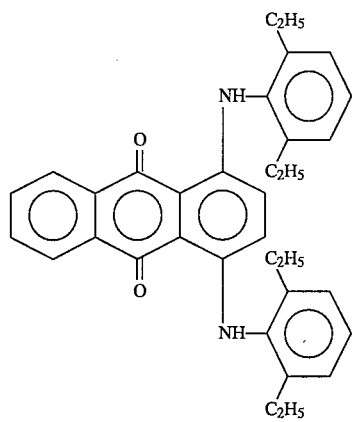

nC₆H₁₃OOCCH₂
|
nC₆H₁₃OOCCH—SO₃Na

| was contained as an emulsion dispersant in the latex solution in a proportion of 0.4 wt % based on a latex solid content | |
|---|---|
| Sodium 2,4-dicholoro-6-hydroxy-s-triazine (4% solution) | 20.5 ml |
| Distilled water | 900.5 ml |

The second subbing layers having the following composition were applied on the above both first subbing layers with the wire bar coater so that the coated amounts of the respective components became as shown below, followed by drying at 150° C.:

| Gelatin | 160 mg/m² |
|---|---|
| Dye dispersion D-1 (as a dye solid content | 35 mg/m² |
| 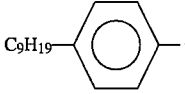 | 8 mg/m² |
|  | 0.27 mg/m² |
| Matting agent (polymethyl methacrylate with an average grain size of 2.5 μm) | 2.5 mg/m² |

Preparation of Photographic Material:

The foregoing emulsion layer and surface protective layer were provided on the both sides of the support prepared above by a simultaneous extrusion process to thereby prepare Photographic Material 1-1. Further, Photographic Materials 1-2 to 1-9 were prepared in the same manner as that in Photographic Material 1-1 except that the solid fine grain dispersion contained in the second subbing layer was replaced with the respective dyes shown in Table 1.

The coated silver amount per one side was set at 1.75 g/m².

TABLE 1

| Photographic Material | Dye | Coated Amount per One Side (mg/m²) | λmax in Coated Film (nm) | λmax in DMF (nm) |
|---|---|---|---|---|
| 101 (Inv.) | I-21 | 35 | 546 | 492 |
| 1-2 (Inv.) | I-22 | 35 | 551 | 490 |
| 1-3 (Inv.) | I-23 | 35 | 550 | 500 |
| 1-4 (Inv.) | I-24 | 35 | 548 | 493 |
| 1-5 (Inv.) | I-25 | 35 | 542 | 493 |
| 1-6 (Comp.) | Comp. Dye 1 | 35 | 540 | 542 |
| 1-7 (Comp.) | Comp. Dye 2* | 35 | 520 | 520 |
| 1-8 (Comp.) | Comp. Dye 3 | 35 | 503 | 495 |
| 1-9 (Comp.) | — | — | — | — |

(*) Comparative Dye 2 was disolved and became homogeneous in dispersing.

Comparative dye 1: the compound described in JP-A-64-40827

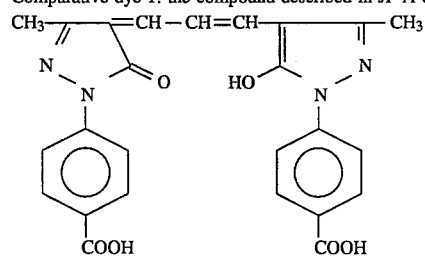

Comparative dye 2

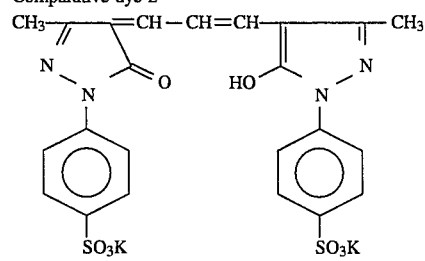

Comparative dye 3: the compound described in JP-A-3-223747

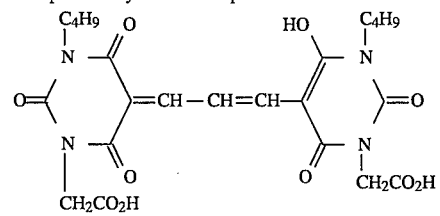

Evaluation of Photographic Performances

A GRENEX ortho screen HR-4 manufactured by Fuji Photo Film Co., Ltd. was tightly contacted to one side of a photographic material with an aid of a cassette and the photographic material was subjected to an X ray sensitometry. An exposure was adjusted by changing a distance between an X ray tube and the cassette. After exposure, the photographic material was subjected to a processing with an automatic developing machine in the following developing solution and fixing solution. A sensitivity was expressed by a value relative to that of the Photographic Material 1-9, which was set at 100.

Measurement of Sharpness (MTF):

The above cassette (the HR-4 screen was sticked on the both sides thereof) and the processing with the automatic developing machine were combined to measure MTF. The measurement was carried out at an aperture of 30 μm×500 μm and the sharpness was evaluated with an MTF value having a space frequency of 1.0 cycle/mm at a portion having an optical density of 1.0.

Measurement of Residual Color

An unexposed photographic film was subjected to the processing with the above automatic developing machine, and then a green color transmission density thereof was measured through a Macbeth status A filter. Meanwhile, a non-subbed blue-colored polyethylene terephthalate support was subjected to a measurement of a green color transmission density, and a net value obtained by deducting the latter value from the former one was evaluated as a residual color density.

The automatic developing machine used for this experiment was an automatic developing machine FPM-9000 type manufactured by Fuji Photo Film Co., Ltd., which was modified so as to equip an infrared dryer in a drying unit, and the processing steps therefor are as shown in the following Table 2. An average processing amount of a light-sensitive material is 200 sheets (sheet size: 25.4 cm×30.5 cm) per day.

TABLE 2

| Processing Step | Amount of Solution in Processing Bath* (liter) | Processing Temperature (°C.) | Processing Path Length (mm) | Processing Time (sec.) |
|---|---|---|---|---|
| Development | 15 | 35 | 613 | 8.8 |
| Fixing | 15 | 32 | 539 | 7.7 |
| Washing | 13 | 17 Flowing Water | 263 | 3.8 |
| Squeeze | | | 304 | 4.4 |
| Drying | | 58 | 368 | 5.3 |
| Total | | | 2087 | 30.0 |

*Solution surface area to processing bath volume ratio = 25 cm²/liter

The processing solutions and replenishing solutions therefor are as follows:

Development Processing:
Preparation of Condensed Solutions:

(1) Developing Solution:

Part agent A:

| | |
|---|---|
| Potassium hydroxide | 330 g |
| Potassium sulfite | 630 g |
| Sodium sulfite | 255 g |
| Potassium carbonate | 90 g |
| Boric acid | 45 g |
| Diethylene glycol | 180 g |
| Diethylenetriaminepeantaacetic acid | 30 g |
| 1-(N,N-diethylamino)-ethyl-5-mercapto-tetrazole | 0.75 g |
| Hydroquinone | 450 g |
| 4-Hydroxymethyl-4-methyl-1-phenyl-3-pyrazolidone | 40 g |
| Water to make | 4125 ml |

Part agent B:

| | |
|---|---|
| Diethylene glycol | 525 g |
| 3,3'-Dithiobishydrocinnamic acid | 3 g |
| Glacial acetic acid | 102.6 g |
| 5-Nitroindazole | 3.75 g |
| 1-Phenyl-3-pyrazolidone | 65 g |
| Water to make | 750 ml |

Part agent C:

| | |
|---|---|
| Glutaraldehyde (50 wt/wt %) | 150 g |
| Potassium bromide | 15 g |

-continued

| Development Processing: Preparation of Condensed Solutions: | |
|---|---|
| Potassium metabisulfite | 105 g |
| Water to make | 750 ml |
| (2) Fixing Solution: | |
| Ammonium thiosulfate (70 wt/vol %) | 3000 ml |
| Disodium ethylenediaminetetraacetate dihydrate | 0.45 g |
| Sodium sulfite | 225 g |
| Boric acid | 60 g |
| 1-(N,N-dimethylamino)-ethyl-5-mercapto-tetrazole | 15 g |
| Tartaric acid | 48 g |
| Glacial acetic acid | 675 g |
| Sodium hydroxide | 225 g |
| Sulfuric acid (36N) | 58.5 g |
| Aluminum sulfate | 150 g |
| Water to make | 600 ml |
| pH | 4.68 |

Preparation of Processing Solutions:

The above condensed developing solution was filled in the following vessel by each part agent. This vessel was constituted by combining each of the part vessels for the part agents A, B and C with the vessel itself so as to make one vessel.

Also, the above condensed fixing solution was filled as well in the similar vessel.

First, 30 ml of an aqueous solution containing acetic acid (54 g) and potassium bromide (55.5 g) was put as a starter in a developing bath.

The upsided-down vessels containing the above processing solutions were inserted in the drilling blades disposed in the processing solution stock tanks equipped on a side plane of the automatic developing machine to break the sealing membranes provided on the caps, and the respective processing solutions in the vessels were filled in the stock tanks.

These respective processing solutions were filled in a developing bath and a fixing bath of the automatic developing machine in the following ratio by operating the pumps each equipped in the automatic developing machine.

Further, every time a light-sensitive material was processed by eight sheets (sheet size: 25.4 cm×30.5 cm), the stock processing solutions were diluted with water in the following ratios to replenish to the processing baths in the automatic developing machine.

| Developing Solution: | |
|---|---|
| Part agent A | 55 ml |
| Part agent B | 10 ml |
| Part agent C | 10 ml |
| Water | 125 ml |
| pH | 10.50 |
| Fixing Solution: | |
| Condensed solution | 80 ml |
| Water | 120 ml |
| pH | 4.62 |

City water was filled in a washing bath.

The results are shown in Table 3.

TABLE 3

| Photographic Material | Dye | Relative Sensitivity* | MTF | Residual Color |
|---|---|---|---|---|
| 1-1 (Inv.) | I-21 | 100 | 0.56 | 0.01 |
| 1-2 (Inv.) | I-22 | 100 | 0.56 | 0.02 |
| 1-3 (Inv.) | I-23 | 100 | 0.56 | 0.01 |
| 1-4 (Inv.) | I-24 | 100 | 0.56 | 0.02 |
| 1-5 (Inv.) | I-25 | 100 | 0.56 | 0.01 |
| 1-6 (Comp.) | Comp. Dye 1 | 88 | 0.55 | 0.03 |
| 1-7 (Comp.) | Comp. Dye 2 | 80 | 0.56 | 0.03 |
| 1-8 (Comp.) | Comp. Dye 3 | 93 | 0.56 | 0.02 |
| 1-9 (Comp.) | — | 100 | 0.42 | 0.00 |

*Relative sensitivity on a front side.

It can be found from the results summarized in Table 3 that the use of the dyes of the present invention can provide the photographic material which gives less reduction of a sensitivity and an excellent sharpness as well as a less residual color.

EXAMPLE 2

(Preparation of Emulsion A)

$(NH_4)_3RhCl_6$ and $K_3IrCl_6$ were added to a 0.13M silver nitrate aqueous solution and a halide aqueous solution containing 0.04M potassium bromide and 0.1M sodium chloride, and the solution thus prepared was added to a gelatin aqueous solution containing sodium chloride and 1,3-dimethylimidazolidine- 2-thione at 43° C. for 12 minutes by a double jet process while stirring, whereby there were obtained silver chlorobromide grains having an average grain size of 0.15 μm and a silver chloride content of 70 mole % to carry out a nucleus formation. Subsequently, a 0.87% silver nitrate aqueous solution and a halide aqueous solution containing 0.26M potassium bromide and 0.65M sodium chloride were similarly added thereto by the double jet process over a period of 20 minutes. Then, the emulsion thus prepared was washed with water according to a conventional process by a flocculation process. Gelatin (40 g) was added thereto and pH and pAg were adjusted to 6.5 and 7.5, respectively. Further, there were added sodium benzenethiosulfonate (20 mg), sodium thiosulfate (5 mg) and chlorauric acid (8 mg) each per mole of silver, and heating was applied at 60° C. for 75 minutes to effect a chemical sensitizing treatment, followed by adding 4-hydroxy-6-methyl-1,3,3a,7-tetrazaindene (150 mg) as a stabilizer, whereby there were obtained silver bromochloride cubic grains having an average grain size 0.26 μm and a silver chloride content of 70 mole % and containing an Rh compound of $1×10^{-7}$ mole and an Ir compound of $5×10^{-7}$ mole each per mole of silver (fluctuation coefficient: 10%).

Preparation of Dye Dispersion:

There were previously stirred and mixed, a dye (2.5 g), a 4.3% aqueous solution (10.3 g) of a surface active agent (trade name: Triton X-200, manufactured by Rohm & Haas Co., Ltd.), and water (50.5 g), and the solution thus prepared was put in an Igar motor mill (M-50, manufactured by Igar Japan Co., Ltd.) having provided therein 40 ml of zirconia beads (0.8 to 1.2 mm in diameter) to disperse it at a rotation number of 5000 r.p.m., whereby a fine crystal dispersion of the dye with a grain size of 1 μm or less was obtained. The fine crystal dispersion of the dye thus prepared (50 g), gelatin (1.8 g) and water (13.3 g) were stirred and mixed at 40° C. to use for preparing a photographic light-sensitive material.

(Preparation of Photographic Light-Sensitive Materials 2-1 to 2-10)

Emulsion Layer Coating Solution:

A 0.05% methanol solution of the following sensitizing dye-1 (30 mg per mole of silver) was added to Emulsion A.

Further, there were added disodium 4,4-bis(4,6-dinaphthoxypyrimidine-2-ylamino)-stilbene-disulfonate (300 mg per mole of silver) and 2,5-dimethyl-3-allylbenzothiazole iodide (450 mg per mole of silver) for supersensitization and stabilization.

Sensitizing Dye-1:

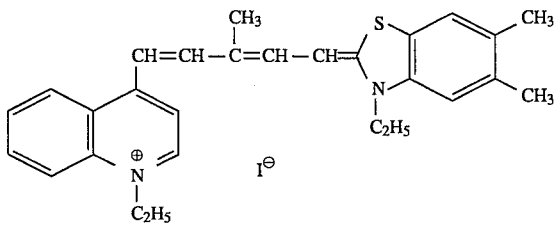

Emulsion Layer:

| | |
|---|---|
| Gelatin | 1.6 g/m² |
| Coated silver amount | 3.4 g/m² |
| Hydroquinone | 0.1 g/m² |
| Polyethylene acrylate latex | 0.4 g/m² |
| 2-Bis(vinylsulfonylacetamide)ethane | 86 mg/m² |

Dye layer-1:

| | |
|---|---|
| Gelatin | 0.5 g/m² |
| Dye (kind and amount are shown in Table 4) | |
| Polymethyl methacrylate (particle size: 2.5 μm) | 60 mg/m² |
| Colloidal silica (particle size: 10 μm) | 70 mg/m² |
| Sodium dodecylbenzenesulfonate | 38 mg/m² |

Dye layer-2:

| | |
|---|---|
| Gelatin | 0.5 g/m² |
| Dye (kind and amount are shown in Table 4) | |
| Sodium dodecylbenzenesulfonate | 17 mg/m² |
| Poly(sodium styrenesulfonate) | 44 mg/m² |
| 2-Bis(vinylsulfonylacetamide)ethane | 33 mg/m² |

Dye a

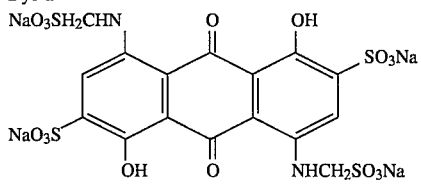

Dye b

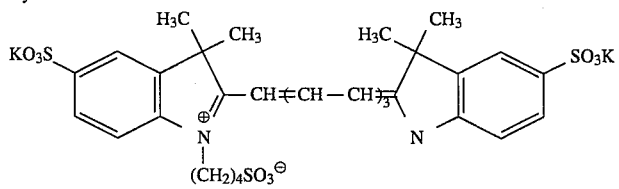

Dye c

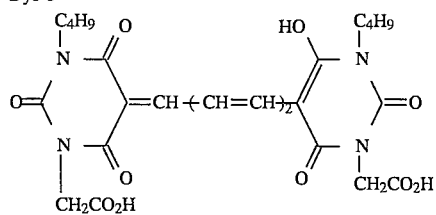

Dye d

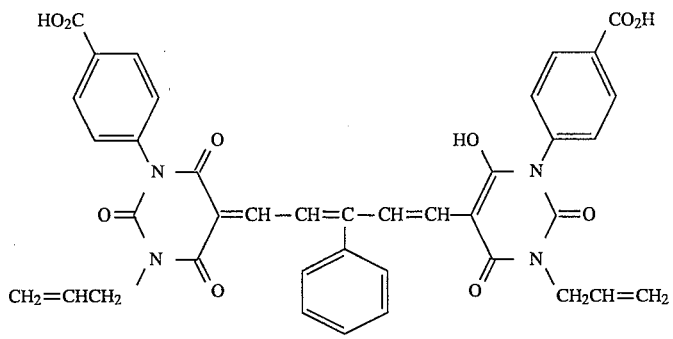

Dye e

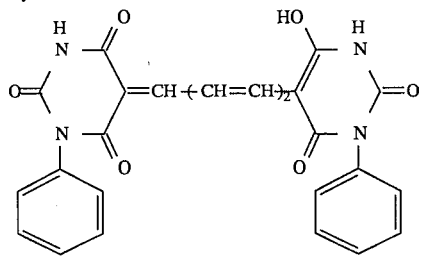

Multi-layers were simultaneously coated on a support in the above amounts in the order of the dye layer-2, the emulsion layer and the dye layer-1 (from a support side) to thereby prepare Photographic Materials 2-1 to 2-10.

The support used in this example (180 μm thick polyethylene terephthalate) had a back layer and a back protective layer of the following compositions.

| Back Layer: | |
|---|---|
| Gelatin | 2.0 g/m² |
| Sodium dodecylbenzenesulfonate | 80 mg/m² |
| 1,3-divinylsulfon-2-propanol | 60 mg/m 2 |
| Back Protective Layer: | |
| Gelatin | 0.5 g/m² |
| Polymethyl methacrylate (particle size: 4.7 mm) | 30 mg/m² |
| Sodium dodecylbenzenesulfonate | 20 mg/m² |
| Fluorine-containing surface active agent | 2 mg/m² |
| Silicone oil | 100 mg/m² |

Evaluation of Photographic Performance:

The samples thus obtained were stored in the condition of 40° C. and 80% RH for 3 days and then were subjected to a scanning exposure with a semiconductor laser having an emission peak in 780 nm. An exposure time corresponds to $10^{-7}$ sec/spot. Subsequently, the samples were subjected to a sensitometry at the temperature and time shown below with an automatic developing machine FG-710NH manufactured by Fuji Photo Film Co., Ltd.)

| Developing | 38° C. | 14 seconds |
|---|---|---|
| Fixing | 37° C. | 9.7 seconds |
| Washing | 26° C. | 9 seconds |
| Squeeze | | 2.4 seconds |
| Drying | 55° C. | 8.3 seconds |
| Total | | 43.4 seconds |

The compositions of the developing solution and fixing solution used are as follows:

| Developing Solution: | |
|---|---|
| Hydroquinone | 25.0 g |
| 4-Methyl-4-hydroxymethyl-1-phenyl-3-pyrazolidone | 0.5 g |
| Potassium sulfite | 90.0 g |
| Disodium ethylenediaminetetraacetate | 2.0 g |
| Potassium bromide | 5.0 g |
| 5-Methylbenzotriazole | 0.2 g |
| 2-Mercaptobenzimidazole-5-sulfonic acid | 0.3 g |
| Sodium carbonate | 20 g |
| Water to make | 1 liter |
| (Sodium hydroxide was added to adjust pH to 10.6) | |
| Fixing Solution: | |
| Ammonium thiosuifate | 210 g |
| Sodium sulfite (anhydrous) | 20 g |
| Disodium ethylenediaminetetraacetate | 0.1 g |
| Glacial acetic acid | 15 g |
| Water to make | 1 liter |
| (pH was adjusted to 4.8 with aqueous ammonia) | |

A sensitivity was expressed by a logarithm of an exposure giving a density of 3.0 and a difference in a sensitivity of a sample before storing from that of a sample subjected to the same processing was obtained as a desensitization. The results are shown in Table 4.

Evaluation of Residual Color:

An unexposed film was subjected to the automatic development processing described above. The residual color of the sample thus obtained was compared with that of a support; practicably no problem on the residual color was shown by "○" in Table 4; and a little problem or a problem on the residual color was shown by "Δ" or "×", respectively in Table 4.

TABLE 4

| Photographic Material | Dye Layer-1 | Dye Layer-2 | Film Absorption in Dye Layer-2* (nm) | Desensitivity | Residual Color |
|---|---|---|---|---|---|
| 2-1 (Inv.) | Dye a 20 mg/m² | I-1 130 mg/m² | 789 (618*) | 0.02 | ○ |
| 2-2 (Inv.) | Dye a 20 mg/m² | I-3 130 mg/m² | 786 (615*) | 0.04 | ○ |
| 2-3 (Inv.) | Dye a 20 mg/m² | I-4 130 mg/m² | 786 (615*) | 0.03 | ○ |
| 2-4 (Inv.) | Dye a 20 mg/m² | I-11 130 mg/m² | 735 (622*) | 0.02 | ○ |
| 2-5 (Inv.) | Dye a 20 mg/m² | I-17 130 mg/m² | 730 (645*) | 0.02 | ○ |
| 2-6 (Comp.) | Dye a 20 mg/m² | Dye b 130 mg/m² | 748 (748*) | 0.18 | Δ |
| 2-7 (Comp.) | Dye a 20 mg/m² | Dye c 130 mg/m² | 602 (590*) | 0.10 | ○ |
| 2-8 (Comp.) | Dye a 20 mg/m² | Dye d 130 mg/m² | 620 (625*) | 0.03 | × |
| 2-9 (Comp.) | Dye a 20 mg/m² | Dye e 130 mg/m² | 702 (594*) | 0.10 | Δ |
| 2-10 (Comp.) | Dye a 20 mg/m² | None 130 mg/m² | — | 0.02 | ○ |

*Absorption in DMP

It can be found from the results summarized in Table 4 that the samples (Photographic Materials 2-1 to 2-5) to which the dyes of the present invention were added have less desensitization also in the stored samples as compared with the comparative samples (Photographic Materials 2-6 to 2-7 and 2-9) to which the publicly known dyes were added and that the dye of the present invention is an excellent dye. It can be found as well that while the comparative samples (Photographic Materials 2-6 and 2-8 to 2-9) to which the publicly known dyes were added have the bluish residual color, the samples to which the dyes of the present invention were added reside at a level of the residual color at which no practicable problem is involved and that the dyes of the present invention are excellent as well in terms of a decoloring performance. Further, all of the samples to which the dyes were added had an excellent sharpness as compared with the sample (Photographic Material 2-10) to which the dye was not added.

EXAMPLE 3

The following back layer and surface protective layer were coated on one face of a polyethylene terephthalate support having a thickness of 180 μm coated on the both sides thereof with a subbing layer.

| (Back layer) | |
|---|---|
| Gelatin | 2.7 g/m² |
| Solid fine particle dispersion of dye (shown in Table 5) (coated amount described in Table 5) | |
| Poly(sodium styrenesulfonate) | 0.1 g/m² |
| N,N'-ethylenebis-(vinylsulfonacetoamide) | 0.06 g/m² |

The solid fine particle dispersions A and B of the the following dyes A and B were used for comparison.

Dye A

[Structure: naphthoquinone with CONH-phenyl-COOH substituent, =N-phenyl with two CH₃ groups]

(No. 6 described in Japanese Patent Application No. Hei. 4-220424)

HOOCCH₂NCH₂CH₂NHSO₂CH₃

Dye B

[Structure: naphthoquinone with SO₂NH-phenyl-COOH substituent, =N-phenyl with CH₃ group]

(No. 12 described in Japanese Patent Application No. Hei. 4-220424)

C₂H₅NCH₂CH₂COOH (Surface Protective Layer for Back Layer)

| Gelatin | 0.5 g/m² |
|---|---|
| Polymethyl methacrylate fine particle (average particle size: 3 μm) | 20 mg/m² |
| Sodium t-octylphenoxyethoxyethanesulfonate | 50 mg/m² |
| C₈F₁₇SO₂N(C₃H₇)CH₂COOK | 5 mg/m² |
| C₈F₁₇SO₂N(C₃H₇)(CH₂CH₂O)₁₅—H | 2 mg/m² |

The following emulsion layer and protective layer were coated on an another face of the support.
(Emulsion Layer)
A silver halide emulsion was prepared as follows:
Gelatin (40 g) was dissolved in water (1 liter), and sodium chloride (6 g), potassium bromide (0.4 g), and the compound (I):

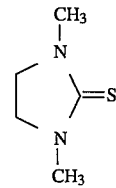

(60 mg) were put in a vessel heated at 53° C. Then, an aqueous solution (600 ml) containing silver nitrate (100 g) and an aqueous solution (600 ml) containing potassium bromide (56 g) and sodium chloride (7 g) were added by a double jet process to form a core portion of silver chloride (20 mole %). Thereafter, an aqueous solution (500 ml) containing silver nitrate (100 g) and an aqueous solution (500 ml) containing potassium bromide (13 g), sodium chloride (27 g) and potassium hexachloroiridate (III) (10.7 mole/mole silver) were added by the double jet process to form a shell portion of silver chloride (80 mole %), whereby a so-called core/shell type cubic monodispersed silver chlorobromide grain having an average grain size of 0.20 μm was prepared.
After this emulsion was subjected to a desalt treatment, gelatin (40 g) was added and pH and pAg were adjusted to 6.0 and 8.5, respectively. Then, triethylthiourea (2 mg), chlorauric acid (4 mg), and 4-hydroxy- 6-methyl-1,3,3a,7-tetrazaindene (0.2 g) were added to effect a chemical sensitization at 60° C. (Emulsion B).

Preparation and coating of an emulsion coating solution were carried out as follows.

A vessel in which Emulsion B (850 g) was contained was heated to 40° C. and the following additives were added to thereby prepare the emulsion coating solution.

(Emulsion Coating Solution)

| | | |
|---|---:|---|
| 1. Emulsion B | 850 | g |
| 2. Spectral sensitizing dye (II) | $1.2 \times 10^{-4}$ | mole |
| 3. Supersensitizing dye (III) | $0.8 \times 10^{-3}$ | mole |
| 4. Storing performance improver (IV) | $1 \times 10^{-3}$ | mole |
| 5. Polyacrylamide (molecular weight: 40,000) | 7.5 | g |
| 6. Trimethylolpropane | 1.6 | g |
| 7. Poly(sodium styrenesulfonate) | 2.4 | g |
| 8. Latex of poly(ethyl acrylate/ methacrylic acid) | 16 | g |
| 9. N,N'-ethylenebis-(vinylsulfonacetoamide) | 1.2 | g |

This coating solution was applied so that a coated silver amount and a gelatin coated amount became 2.5 g/m² and 1.2 g/m², respectively.

-continued

| | | |
|---|---:|---|
| (molecular weight: 600,000) | | |
| 4. N,N'-ethylenebis-(vinylsulfonacetoamide) | 1.5 | g |
| 5. Polymethyl methacrylate fine particle (average particle size: 2.0 μm) | 2.2 | g |
| 6. Sodium t-octylphenoxyethoxyethanesulfonate | 1.2 | g |
| 7. $C_{16}H_{33}O$—$(CH_2CH_2O)_{10}$—H | 2.7 | g |
| 8. Poly(sodium acrylate) | 4 | g |
| 9. $C_8F_{17}SO_3K$ | 70 | mg |
| 10. $C_8F_{17}SO_2N(C_3H_7)$ $(CH_2CH_2O)_4(CH_2)_4$—$SO_3Na$ | 70 | mg |
| 11. NaOH (1N) | 4 | mg |
| 12. Methanol | 60 | mg |

This coating solution was applied so that a gelatin coated amount became 1 g/m².

The sample thus obtained was stored under an environment of 25° C. and 60% RH for 10 days, and then the following evaluations were carried out.

(Evaluation of Residual Color)

A sample of a 25.4×30.5 cm size was subjected to a development processing with an NRN automatic developing machine (manufactured by Fuji Photo Film Co., Ltd.) at the following conditions. The sample was continuously passed Spectral sensitizing dye (II)

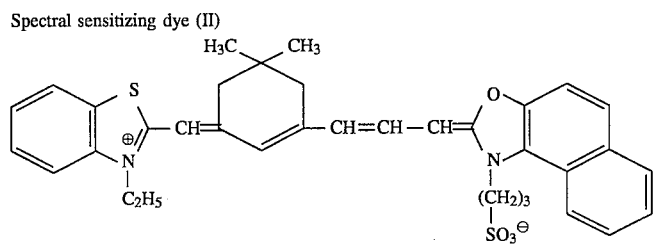

Supersensitizing dye (III)

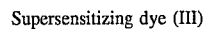

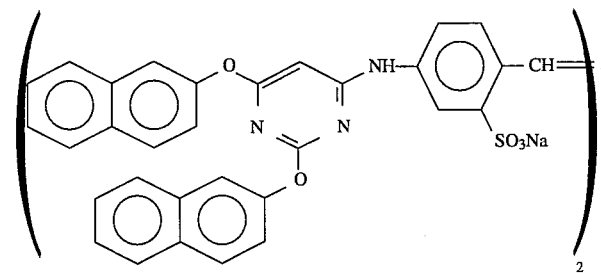

Storing performance improver (IV)

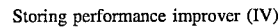

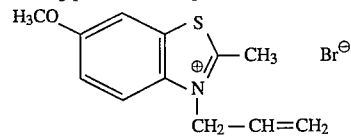

(Protective Layer)

A vessel was heated to 40° C. and the additives were added in the following composition to thereby prepare a coating solution.

| | | |
|---|---:|---|
| 1. Gelatin | 100 | g |
| 2. Polyacrylamide (molecular weight: 40,000) | 10 | g |
| 3. Poly(sodium styrenesulfonate) | 0.6 | g | by 50 sheets and the fiftieth sheet was used.

| | | | |
|---|---|---|---|
| Developing | RD-10 | (manufactured by Fuji Photo Film Co., Ltd.) | 35° C. |
| Fixing | RF-10 | (manufactured by Fuji Photo Film Co., Ltd.) | 35° C. |
| Dryer | 55° C. | | |
| Processing time | Dry to Dry: 30 seconds | | |

The processed sample thus obtained was visually observed immediately after processing and after storing under a humid and hot condition of 50° C. and 80% RH to evaluate a degree of a residual color.

Rank 1: no residual color is observed.

Rank 2: residual color was observed but at a level which is practically no problem.

Rank 3; level which is practically a problem.

The results are shown in Table 5.

The samples of the present invention had no residual color and an excellent storing performance after processing.

(Evaluation of Sensor Detectability)

Figure 1:
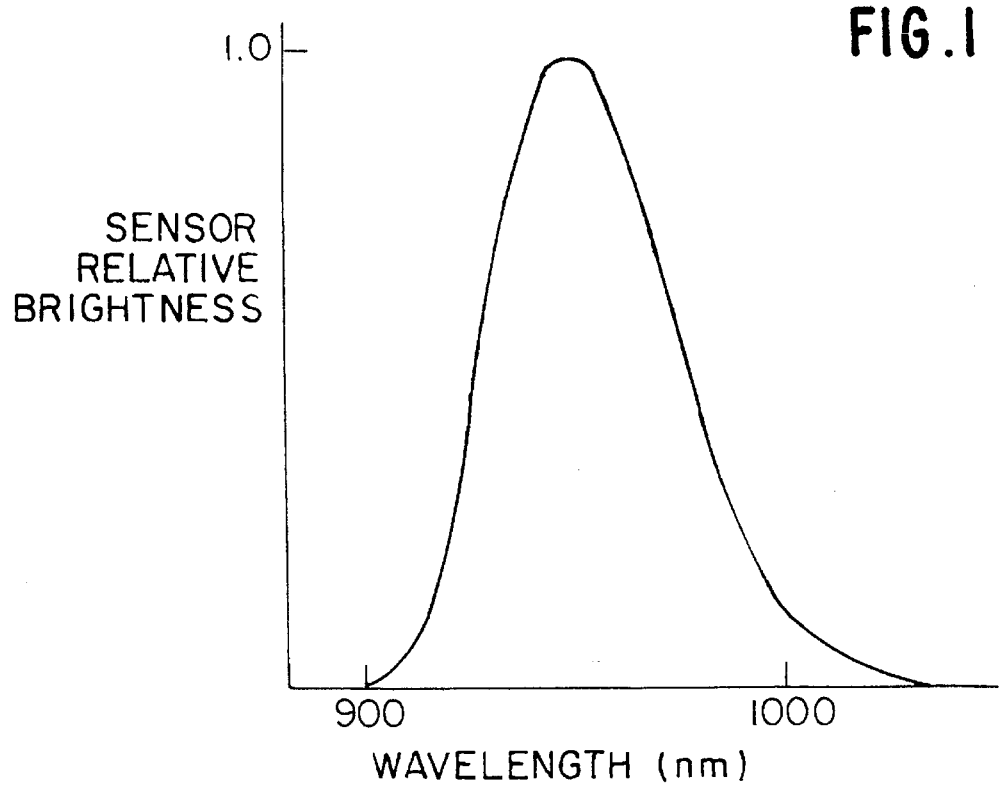
FIG. 1 shows a spectral sensitivity characteristic of an infrared ray emitting element at a film inserting port of the automatic developing machine used in Example 3.

Each 10 sheets of the sample were inserted from a film inserting port to test if they were detected. This automatic developing machine has a pair of an infrared emitting element (refer to FIG. 1) and a light receiving element (refer to FIG. 2) at an inserting port and is of a mechanism in which the inserted sample fully shuts off an infrared ray to recognize insertion of the sample and a transporting roller is started thereby to transport a film to a developing bath.

A sensor detectability was evaluated with the number of the sheet detected of 10 sheets. The larger the number is, the more preferable. The results are shown in Table 5. While Comparative Sample I-6 was not detected at all, the samples of the present invention provided a high detectability.

(Surface protective layer for a back layer)

| | |
|---|---|
| Gelatin | 0.5 g/m$^2$ |
| Polymethyl methacrylate fine particle (average particle size: 3 μm) | 20 mg/m$^2$ |
| Sodium t-octylphenoxyethoxyethanesulfonate | 50 mg/m$^2$ |
| $C_8F_{17}SO_2N(C_3H_7)CH_2COOK$ | 5 mg/m$^2$ |
| $C_8F_{17}SO_2N(C_3H_7)(CH_2CH_2O)_{15}$—H | 2 mg/m$^2$ |

The following emulsion layer and protective layer were coated on an another face of the support.

(1) Preparation of Silver Halide Emulsion:

A suitable amount of ammonia was put in a vessel gelatin, potassium bromide and water and heated to 55° C. Then, a silver nitrate aqueous solution and a potassium bromide aqueous solution (containing $1 \times 10^{-7}$ mole (per mole of silver) of Rh salt and $5 \times 10^{-7}$ mole (per mole of silver) of Ir salt) were added by a double jet process while maintaining pAg in the reaction vessel at 7.60, whereby monodispersed silver bromide emulsion grains having an average grain size of 0.55 μm were prepared. In this emulsion grain, 98% of the whole grain number was falling within ±40% of the average grain size. After subjecting this emulsion to a desalt treatment, pH and pAg were adjusted to 6.2 and 8.6, respectively, and then a metal/sulfuric acid sensitization was carried out

TABLE 5

| Sample No. | Dye No. | Coated amount | λmax (nm) (λmax (DMF)) | Sensor detectability | Residual color immediately after processing | Residual color storing performance |
|---|---|---|---|---|---|---|
| 3-1 (Inv.) | I-1 | 20 mg/m$^2$ | 789 (618) | 10 | Rank 1 | Rank 1 |
| 3-2 (Inv.) | I-3 | 20 mg/m$^2$ | 786 (615) | 10 | Rank 1 | Rank 1 |
| 3-3 (Inv.) | I-4 | 20 mg/m$^2$ | 786 (615) | 10 | Rank 1 | Rank 1 |
| 3-4 (Inv.) | I-11 | 20 mg/m$^2$ | 735 (622) | 10 | Rank 1 | Rank 1 |
| 3-5 (Inv.) | I-17 | 20 mg/m$^2$ | 730 (645) | 10 | Rank 1 | Rank 1 |
| 3-6 (Comp.) | A | 20 mg/m$^2$ | 786 (696) | 0 | Rank 1 | Rank 1 |
| 3-7 (Comp.) | A | 200 mg/m$^2$ | 786 (696) | 10 | Rank 1 | Rank 3 |
| 3-8 (Comp.) | B | 200 mg/m$^2$ | 762 (686) | 10 | Rank 1 | Rank 3 |

In case of any samples, contamination of a developing solution remained at a level of no problem, and particularly in case of the samples of the present invention, the contamination was low.

EXAMPLE 4

The following back layer and surface protective layer were coated on one face of a polyethylene terephthalate support having a thickness of 180 μm coated on the both sides thereof with a subbing layer.

(Back Layer)

| | |
|---|---|
| Gelatin | 3.0 g/m$^2$ |
| Solid fine (coated amount shown in Table 6) particle dispersion of dye (shown in Table 6) | |
| Poly(sodium styrenesulfonate) | 0.1 g/m$^2$ |
| N,N'-ethylenebis-(vinylsulfonacetoamide) | 0.09 g/m$^2$ | with sodium thiosulfate and chlorauric acid to thereby obtain a desired photographic emulsion. A (100) face/(111) face ratio of this emulsion was measured by a Kublka Munk process to find that it was 98/2. This was designated as Emulsion C.

(3) Preparation of Emulsion Coating Solution:

1 g of Emulsion C was heated to 40° C. to dissolve it. Then, there were added 70 ml of methanol solution of a near infrared region sensitizing dye S-1 ($9 \times 10^{-4}$ mole/liter) of the following chemical structure, 30 ml of 1% 4-hydroxy-6-methyl-1,3,3a,7-tetrazaindene aqueous solution, 40 ml of 5% aqueous solution of dodecylbenezene-sulfonic acid salt as a coating aid, and 20 ml of 3% aqueous solution of a poly(potassium p-vinylbenzenesulfonate) compound as a thickener, to thereby prepare an emulsion coating solution.

S-1:

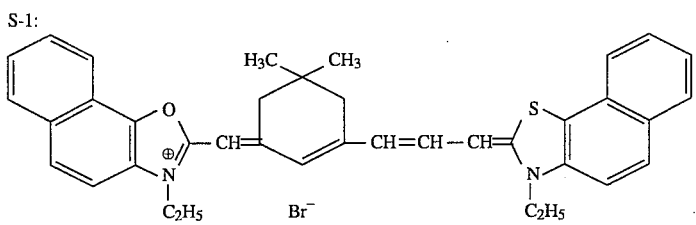

(4) Preparation of Surface Protective Layer-Coating Solution for Light-Sensitive Layer:

There were added to a 10 wt % gelatin aqueous solution heated to 40° C., a thickener/poly(sodium ethylenesulfonate) aqueous solution, a matting agent/polyethyl methacrylate fine particles (average particle size: 3.0 μm), a hardener/N,N'-ethylenebis-(vinylsulfonylacetoamide), a coating aid/sodium t-octylphenoxyethoxyethanesulfonate aqueous solution, a polyethylene series surface active agent aqueous solution as an anti-static agent, and an aqueous solution of a fluorine-containing compound having the following structure, to thereby prepare a coating solution:

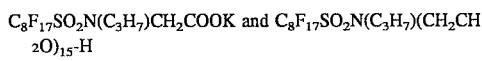

The emulsion coating solution and the surface protective layer-coating solution were simultaneously coated. An emulsion layer had a coated silver amount of 2.9 g/m² and a surface protective layer had a gelatin amount of 1.3 g/m².

Each of these samples was subjected to the following exposing, developing, fixing, washing, and drying treatments with an image exposure/automatic developing equipment.

With respect to an exposure, a scanning exposure was carried out with a semiconductor laser having a wavelength of 780 nm for $10^{-7}$ second.

Development and fixing after the exposure were carried out in the following developing solution and fixing solution. A standard developing temperature was 35° C. and a processing including developing, fixing, washing and drying was carried out for 70 seconds.

That resulted in enabling to obtain an image with a high sharpness in every sample. Further, all samples was excellent in evaluating a residual color. A sensor detectability was 10 sheets and excellent as well.

TABLE 6

| Sample No. | Dye No. | Coated amount | λmax (nm) (λmax (DMF)) |
|---|---|---|---|
| 4-1 | I-1 | 20 mg/m² | 789 (618) |
| 4-2 | I-2 | 20 mg/m² | 780 (614) |
| 4-3 | I-5 | 20 mg/m² | 782 (620) |
| 4-4 | I-11 | 20 mg/m² | 735 (622) |
| 4-5 | I-16 | 20 mg/m² | 742 (633) |

| Developing Solution: | |
|---|---|
| Potassium hydroxide | 16.98 g |
| Glacial acetic acid | 1.8 g |
| Sodium sulfite | 60 g |
| Potassium bicarbonate | 5.0 g |
| Boric acid | 3.0 g |
| Diethylene glycol | 12.0 g |
| Diethylenetriaminepentaacetic acid | 2.0 g |
| 5-Methylbenzotirazole | 0.6 g |
| Hydroquinone | 25.0 g |
| 4-Hydroxymethyl-4-methyl-1-phenyl-3-pyrazolidone | 1.65 g |
| Potassim bromide | 2.0 g |
| Water to make | 1 liter |
| (pH was adjusted to 10.25) | |
| Fixing Solution: | |
| Ammonium thiosulfate | 140 g |
| Sodium sulfite (anhydrous) | 15 g |
| Disodium ethylenediaminetetreaacetate dihydrate | 0.025 g |
| pH was adjusted to 5.1 with glacial acetic acid | |
| Water to make | 1 liter |

Next, an example in which the compound represented by Formula (V) was used as a dye for an optical filter will be described below.

EXAMPLE 5

(Preparation of Optical Filter)

Coating on a polyethylene terephthalate film was carried out in the following coated amounts.

| Aqueous dispersion of I-1 | 70 mg/m² (as silid matter of I-1) |
|---|---|
| Gelatin | 4.0 g/m² |
| Sodium dodecylbenzenesulfonate | 40 mg/m² |
| Poly(sodium styrenesulfonate) | 23 mg/m² |
| 2-Bis(vinylsulfonylacetoamide)ethane | 42 mg/m² |

The aqueous dispersion of I-1 was prepared by the process shown below. That is, there were previously stirred and mixed, I-1 (2.5 g), a 4.3% aqueous solution (10.3 g) of a surface active agent (trade name Triton X-200, manufactured by Rohm & Haas Co., Ltd.), and water (50.5 g). The mixture was put in an Igar motor mill (M-50, manufactured by Igar Japan Co., Ltd.) containing zirconia beads (40 ml) having a diameter of 0.8 to 1.2 mm and was dispersed at 5000 r.p.m., whereby a fine crystal dispersion of a dye having a particle size of 1 μm or less was obtained. The fine crystal dispersion thus obtained of I-1 (50 g), gelatin (1.8 g) and water (13.3 g) were stirred and mixed at 40° C. to thereby prepare an aqueous dispersion of I-1.

It can be found that the film for an optical filter thus obtained is a film having a sharp absorption showing a high absorbance in a near infrared region (λmax 789 nm).

COMPARATIVE EXAMPLE 1

The procedure of Example 5 was repeated, except that I-1 used in Example 5 was replaced with the following comparative compounds described in JP-A-4-352151 and JP-A-63-27838, and the optical densities of the films were measured in the same manner as that in Example 5. The results are shown in Table 7.

Comparative Compound-1:

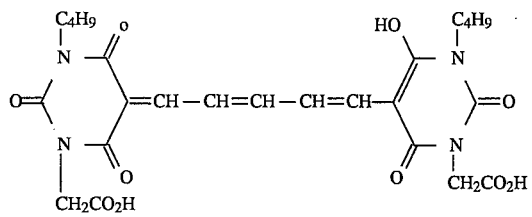

Comparative Compound-2:

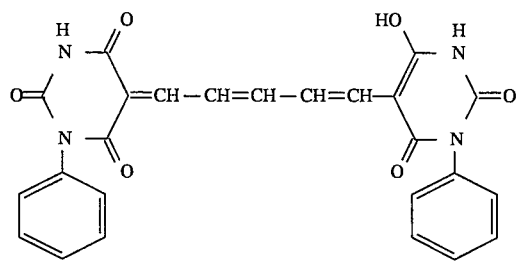

TABLE 7

| Compound | λmax in film (nm) | Half band width (nm) | Absorbance (at λmax) |
| --- | --- | --- | --- |
| I-1 | 789 | 24 | 3.86 |
| Comparative Compound-1 | 602 | Broad | 0.20 |
| Comparative Compound-2 | 702 | 131 | 0.88 |

It can be found from the results shown in Table 7 that an absorption characteristic of the comparative compounds is broadened and an absorption in a near infrared region is almost nothing.
(Evaluation of Stability of Novel Compound)

After storing the respective films for 3 days under the conditions of 50° C. and 80% RH, they were subjected to a measurement of an absorbance at λmax and a ratio thereof to that before storing was calculated to obtain a scale for a stability. A value closer to 100 shows that an absorption wave form is not changed and the stability is high. The results are shown in Table 8.

TABLE 8

| Compound | Residual Rate (%) |
| --- | --- |
| I-1 | 100 |
| Comparative Compound-1 | 279 |
| Comparative Compound-2 | 80 |

It can be found from the results shown in Table 8 that while the comparative compounds show decomposition or dissolution action (the case of the comparative compound-1) after storing, the compound of the present invention does not have a change in an absorption wave form and pretty excels in a stability.

As described above, the present invention provides a photographic material which is low in the sensitivity decrease, excellent in the sharpness, and less in the residual color by using a dye dispersed in the form of a solid fine particle represented by Formula (I) in a hydrophilic colloid layer.

Further, a compound which can readily be synthesized and has a high stability and a sharp absorption having a large absorbance in a near infrared region can be provided by the oxonol compound represented by Formula (V).

While the invention has been described in detailed with reference to specific embodiments, it will be apparent to one skilled in the art that various changes and modifications can be made to the invention without departing from its spirit and scope.

What is claimed is:

1. An oxonol compound represented by the following Formula (V):

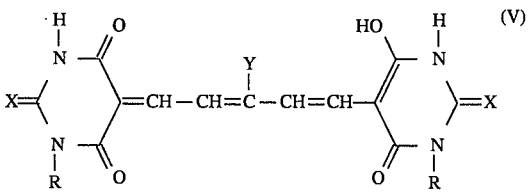

wherein R represents a substituted or unsubstituted phenyl or naphthyl group wherein a substituent for the substituted phenyl or naphthyl group is a halogen atom, a cyano group, a nitro group, a methyl group, an ethyl group, a propyl group, an iso-propyl group, a sec-butyl group, an n-butyl group, a t-butyl group, an unsubstituted amino group, a dimethylamino group, a diethylamino group, a methoxy group, an ethoxy group, a butoxy group, a phenoxy group, a p-methoxyphenoxy group, a phenyl group, a 2-chlorophenyl group, a methoxycarbonyl group, an ethoxycarbonyl group, a methylcarbamoyl group, or an ethylcarbamoyl group; X represents oxygen or sulfur; Y represents an unsubstituted alkyl group having 1 to 4 carbon atoms; provided that each substituent of said substituted phenyl or naphthyl group represented by R is a substituent that does not have a proton capable of being ionized or a salt thereof.

2. The oxonol compound as claimed in claim 1, wherein X represents an oxygen atom atom.

3. The oxonol compound as claimed in claim 2, wherein R represents an unsubstituted phenyl group or a phenyl group substituted with one substituent wherein a substituent for the substituted or unsubstituted phenyl or naphthyl group represents a halogen atom, a cyano group, a nitro group, a methyl group, an ethyl group, a propyl group, an iso-propyl group, a sec-butyl group, an n-butyl group, a t-butyl group, an unsubstituted amino group, a dimethylamino group, a diethylamino group, a methoxy group, an ethoxy group, a butoxy group, a phenoxy group, a p-methoxyphenoxy group, a phenyl group, a 2-chlorophenyl group, a methoxycarbonyl group, an ethoxycarbonyl group, a methylcarbamoyl group, or an ethylcarbamoyl group.

4. The oxonol compound as claimed in claim 3, wherein Y is methyl or ethyl.

5. The oxonol compound as claimed in claim 1, wherein R represents a substituted phenyl or naphthyl group substituted by a halogen atom, a methyl group, an ethyl group, a propyl group, an n-butyl group, a methoxy group or an ethoxy group.

6. The oxonol compound as claimed in claim 1, wherein R represents an unsubstituted phenyl group.

7. The oxonol compound as claimed in claim 1, wherein R represents an unsubstituted phenyl group, Y represents a methyl group, and X represents oxygen.

\* \* \* \* \*